UNITED STATES PATENT OFFICE.

WILLIAM F. COY, OF BOSTON, MASSACHUSETTS.

POWER-GENERATOR.

1,311,877.  Specification of Letters Patent.  Patented Aug. 5, 1919.

Application filed July 24, 1918. Serial No. 246,477.

*To all whom it may concern:*

Be it known that I, WILLIAM F. COY, a citizen of the United States, residing at Boston, in the county of Suffolk and State of Massachusetts, have invented new and useful Improvements in Power-Generators, of which the following is a specification.

This invention relates to gas engines for generating power, and its object is to improve the construction, arrangement and combination of the parts of such engines, so as to enable certain parts to perform a dual function, thus diminishing the number of parts that have hitherto been necessary, and forming a more compact assembly.

Other objects are to provide an improved explosion engine of the two-cycle type of light weight and compact construction, and to provide means for absorbing the thrust momentum of the piston, thus relieving the crank-shaft bearings of pressure, and reducing vibration.

Of the accompanying drawings, forming a part of this specification,—

Fig. 3 is a side elevation, partly in section, of the cylindrical valve hereinafter referred to.

Figure 1:
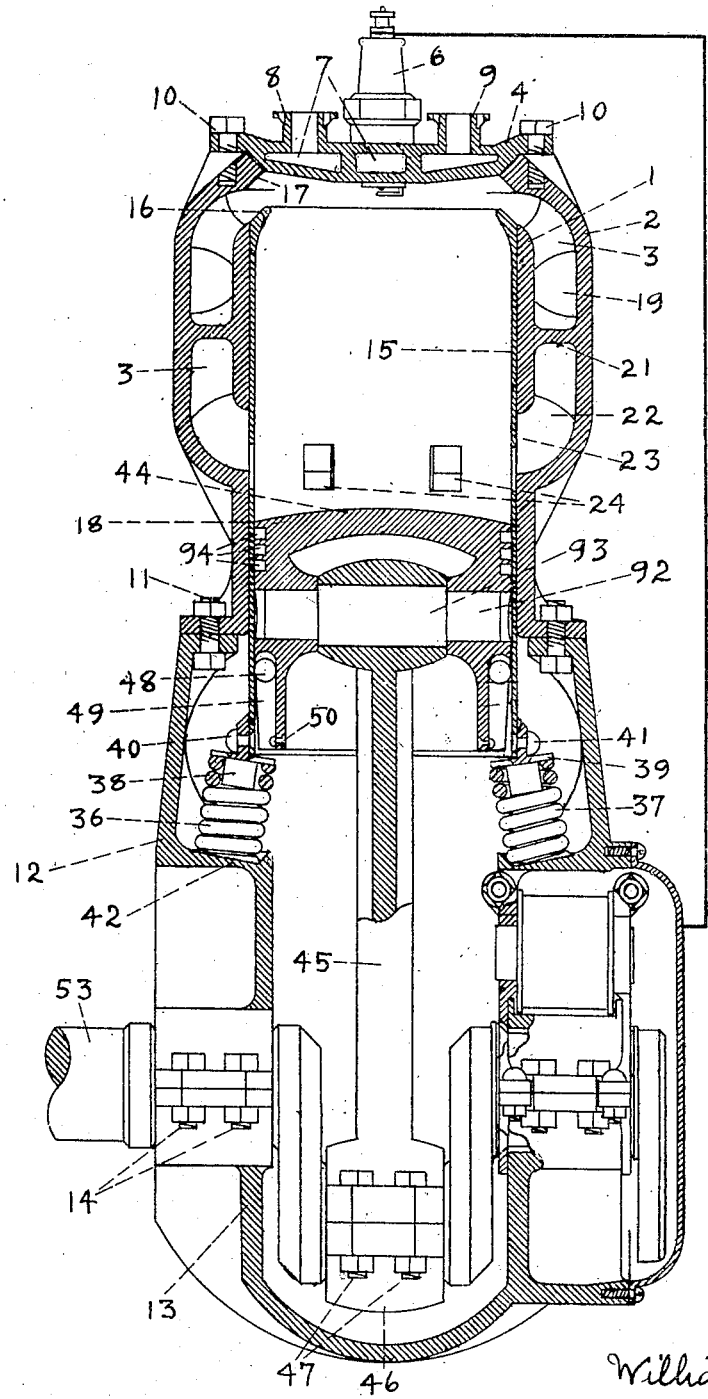
Figure 1 is a side view of a power generator including an explosion engine embodying the invention, parts being shown in vertical section, and other parts in elevation.

The stationary portion of my improved engine includes the steel cylinder 1 integral with an outer jacket 2 and reinforcing webs 3, and the detachable head-plate 4, containing the ignition plugs 5 and 6 and the cooling chamber 7 having an inlet 8 and outlet 9, secured together by bolts 10. The cylinder 1 is secured by bolts 11 to a housing composed of the upper crank case section 12 and lower crank case section 13, secured together by bolts 14.

Within the cylinder 1, and having a sliding fit therein, is the cylindrical sleeve or valve 15, preferably of steel and having a beveled annular face 16 of increased thickness around its upper end adapted to engage a similar beveled annular seat 17 in the head of the outer wall 2 of the cylinder 1. When the valve 15 is depressed, the space between the face 16 and seat 17 forms the valve opening for the admission of fuel gas from the inlet chamber 19 which surrounds the head of cylinder 1, and has a supply opening 20 in the outer jacket 2.

Figure 2:
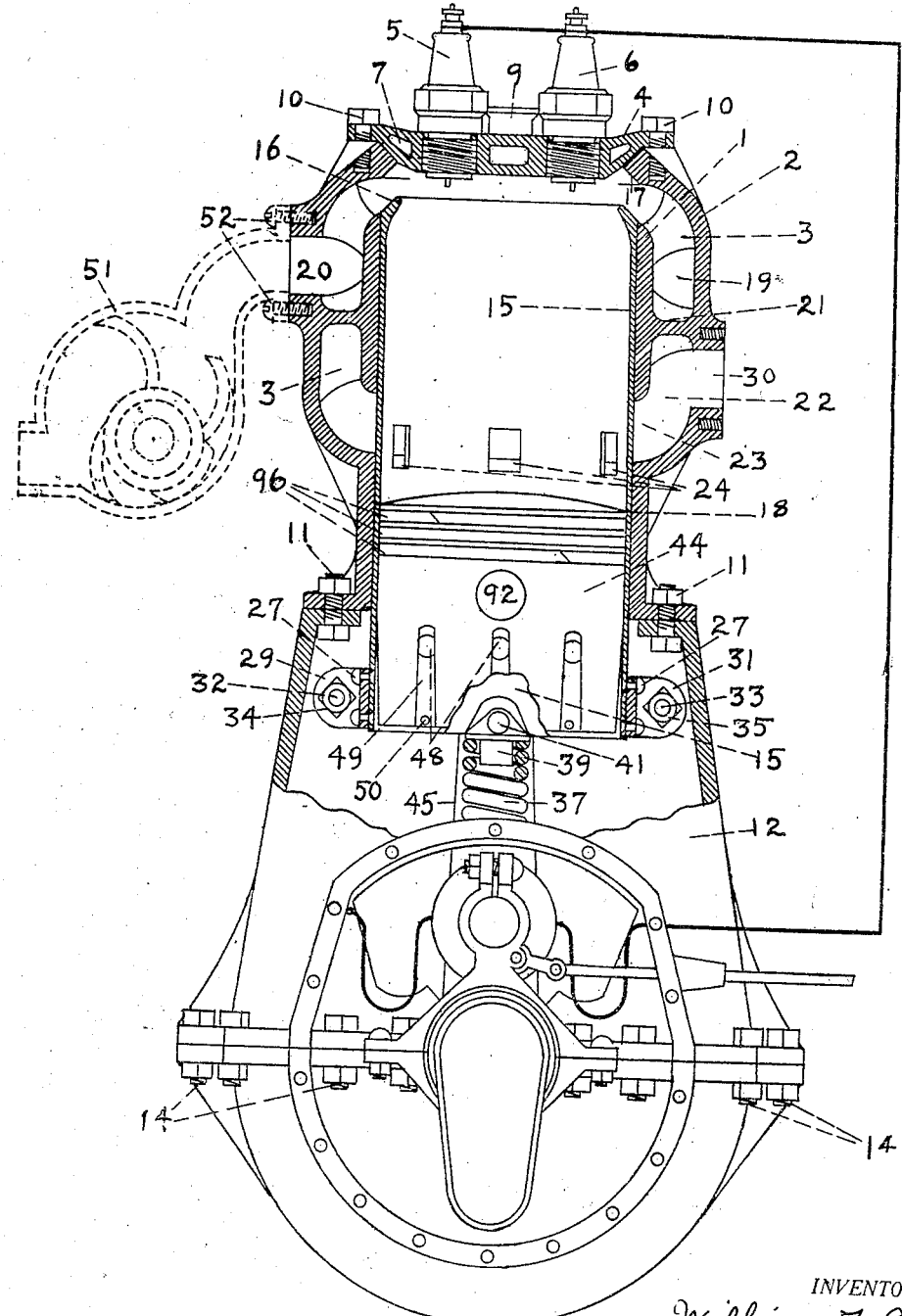
Fig. 2 is an end view of the same, partly in vertical section, and partly in elevation.
Figure 3:
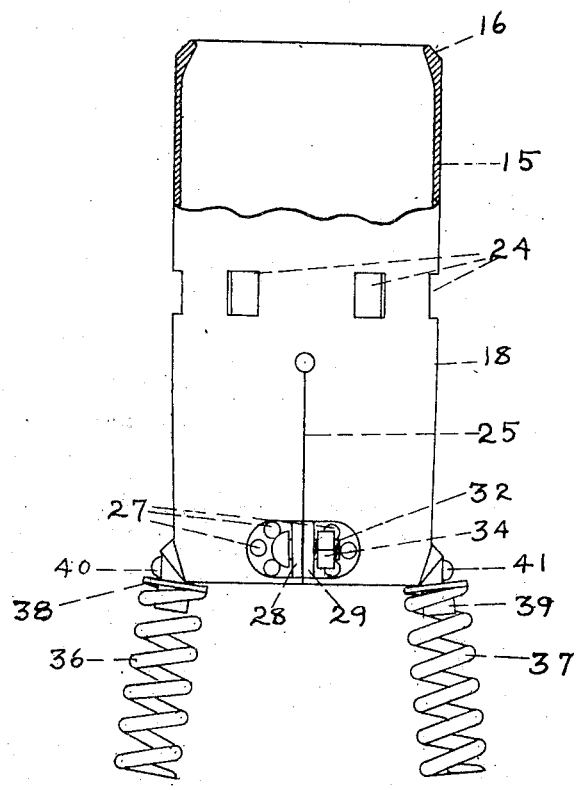

Below the inlet chamber 19 and separated therefrom by a wall 21 is the exhaust chamber 22, having an annular opening 23 encircling the cylindrical valve 15, which has ports 24 at a corresponding level. The ports 24 are in a communicating position opposite the annular opening 23 at all times in the movement of the cylindrical valve 15, this being obtained by giving the opening 23 a suitable width. The exhaust chamber 22 has an outlet 30 (Fig. 2).

The valve 15 is provided with a split extension the portions of which are separated by the clefts 25 and 26 (Figs. 2 and 4), extending from the inner end of the extended cylinder and permitting the extension to assume a tapering form below the point 18, as shown by Fig. 4. The taper is caused by the springing inward of the portions of the split extension due to their normal tension.

Secured by rivets 27 to the lower ends of the cleft-containing portions of the valve 15 (Fig. 4) are the brackets 28 and 29 at opposite sides of one cleft 25, and 30 and 31 at opposite sides of cleft 26. These brackets have outward projections through which pass bolts 32 and 33 which span the clefts. Bolt 32 secures together brackets 28 and 29 across the lower portion of the cleft 25, and bolt 33 similarly secures brackets 30 and 31 together across cleft 26. These brackets perform a dual function. One is to limit the contraction of the split extension of valve 15, and prevent the extension portions from overlapping. The other is to coöperate with the bolts 32 and 33 in limiting the expansion of said split extension, the bolts being provided with heads and with adjustable nuts 34 and 35, said heads and nuts being adapted to bear on the outer sides of the brackets, and thus limit the expansion of the split extension. Restoring means for returning the valve 15 to its upward closing position, are provided by compression springs 36 and 37, placed at diametrically opposite points in the center of the portions of the split extension 15. The pressure of said springs is transmitted to valve 15 through brackets 38 and 39 riveted to valve 15 at 40 and 41. These springs bear on fixed abutments 42 and 43 on the inner walls of the upper crank case 12, and by their slightly angular position, also transmit an inward pressure to the portions of the split extension of the valve 15, thus increasing the contraction due to their normal tension. The tapered portion of the valve 15 is equal in length to the stroke of the piston, presently to be described. This tapered portion forms the thrust-receiving means from the piston for opening the valve 15.

The reciprocating portion of the generator includes the piston 44 and the connecting-rod 45 and cap 46 joined by bolts 47. The connecting-rod 45 is journaled on the piston-pin 92 and bushing 93. The piston-pin 92 passes through a journal in the piston 44, which is provided with grooves 94 for compression rings.

In the invention described herewith, the piston 44 forms the actuating means for opening and closing the valve 15 at its seat in the head of the cylinder 1. The valve 15 forms both the inlet and exhaust controlling means, because a thrust is imparted by the piston 44 to the valve 15 at each downward stroke of the piston 44. This thrust is imparted through bearings 48, preferably balls, carried in longitudinal substantially cylindrical grooves 49 in the lower portion of the outer cylindrical surface of the piston 44, which is tapered slightly at its lower portion similar to the tapered portion of the valve 15. The grooves 49 have contracted mouths opening on the tapered portion of the piston. These bearings 48 (Figs. 1 and 2), project slightly from the grooves 49 and from the tapered portion of the piston 44 and rest normally at the bottom of the grooves 49, where they are held from dropping out by pins 50 riveted in the grooves 49. The diametric span across the piston 44 and its bearings 48, or in other words, the distance between the outer portion of any bearing and the outer portion of the bearing diametrically opposite, is slightly greater than the internal diameter of the lowest portion of the split extension of the valve 15, when the extension is contracted. By means of the bearings 48, a rolling engagement is obtained between the piston 44 and the valve 15 on the downward stroke of the piston 44, which is very gradual, due to the gradual expanding of the lower portion of the valve 15.

The operation of the valve mechanism is as follows: At each downward stroke of the piston 44 the bearings 48 engage the tapered portions of the split extension of the valve 15 and force said portions outward to the limit set by the adjusting nuts 34, 35, when a downward thrust is given to the valve 15, which separates its upper end 16 from the seat 17. This produces a very gradual and gentle engagement between piston 44 and the valve 15 on the opening stroke, and a gradual and gentle restoring of the valve 15 to its closing position on the upward stroke of the piston 44, thus preventing shock and noise in its operation. On the upward stroke of the piston 44, the split extension of the valve 15 is contracted inwardly, by the normal tension of its portions, and the angular pressure of springs 36 and 37, and the bearings 48 return by gravity to the bottom of the grooves 49. The springs 36 and 37 also perform the function of absorbing the inertia momentum of the piston 44 and connecting-rod 45, thus relieving the crank-shaft bearings of vibration pressure. The exhaust ports 24 are passed by the piston 44 slightly earlier in its stroke than the opening of the valve 15.

In this engine it is intended to use forced induction of fuel gas by means of the centrifugal blower 51 shown in dotted outline in Fig. 2, and secured to the inlet opening 20 by bolts 52 and to be driven by any suitable means, preferably by gearing from the crankshaft 52. This would fill the requirement of all two-cycle engines, of compressed fuel gas at the inlet ports, which is performed in most two-cycle engines by compression by the piston in the crankcase.

It will be seen that the bearings 48, and the portions of the split extension of the valve, constitute coöperating members carried respectively by the piston and valve, and adapted to be interengaged by a movement of the piston in one direction to open the valve, and to be disengaged by a movement of the piston in the opposite direction, to permit the closing of the valve.

I claim:

1. In an explosion engine, an annular seating valve located in the cylinder head, forming an inclosing wall of a combustion chamber, and a piston adapted to open said inclosing wall for the admission of fuel.

2. In an explosion engine, a cylindrical valve normally closed and expansible at one end portion, a piston having thrust-transmitting means adapted to alternately open and permit the closing of said valve portion, and an explosion chamber having an annular seat, the said valve having an annular face moved into and out of engagement with said seat.

3. The combination of a cylindrical valve having an annular seating face, an explosion chamber having an annular seat, valve-actuating means comprising a piston, valve-engaging bearings on the said piston to effect the opening of the valve, and means for maintaining the said valve in position to be actuated by the said piston, the last-mentioned means being adapted to restore the valve to its closing position.

4. In an explosion engine, an annular valve, resilient extensions on the said valve for engaging actuating means on the piston to effect the opening of the said valve, and actuating means consisting of anti-friction bearings carried on the piston, and springs for restoring the said valve to a closing position after said actuation.

5. An explosion engine comprising a fixed cylinder having an annular valve seat, an annular valve adapted to engage said seat to close a passage for the admission of fuel gas, a reciprocating piston within said valve, coöperating members carried respectively by the piston and valve, and interengaged by a movement of the piston in one direction to open said valve, said members being disengaged by a movement of the piston in the opposite direction, and means for closing the valve.

6. An explosion engine comprising a fixed cylinder having an annular valve seat, an annular valve adapted to engage said seat to close a passage for the admission of fuel gas, a reciprocating piston within said valve having longitudinal grooves opening on the periphery of the piston, bearings movable in said grooves and projecting from the piston, members carried by the valve and engaged with said bearings to open the valve by a movement of the piston in one direction, the said bearings being disengaged from said members by a movement of the piston in the opposite direction, and means for closing the valve.

7. An explosion engine comprising a fixed cylinder having an annular valve seat, an annular valve adapted to engage said seat to close a passage for the admission of fuel gas, a reciprocating piston within said valve, valve-opening members carried by the piston, the valve being provided with a split normally contracted and tapering extension, the parts of which are engaged with said members by a movement of the piston in one direction, and disengaged therefrom by a movement of the piston in the opposite direction, and means for closing the valve.

8. An explosion engine comprising a fixed cylinder having an annular valve seat, an annular valve adapted to engage said seat to close a passage for the admission of fuel gas, a reciprocating piston within said valve, having longitudinal grooves opening on the periphery of the piston, bearings movable in said grooves and projecting from the piston, the valve being provided with a split normally contracted and tapering extension, the parts of which are engaged with said bearings to open the valve, by a movement of the piston in one direction, the bearings being disengaged from said extension parts when the piston moves in the opposite direction, and means for closing the valve.

9. An explosion engine comprising a fixed cylinder having an annular valve seat, an annular valve adapted to engage said seat to close a passage for the admission of fuel gas, a reciprocating piston within said valve, coöperating members carried respectively by the piston and valve, and interengaged by a movement of the piston in one direction to open said valve, said members being disengaged by a movement of the piston in the opposite direction, and valve-closing springs engaged with the valve.

10. An explosion engine comprising a fixed cylinder having an annular valve seat, an annular valve adapted to engage said seat to close a passage for the admission of fuel gas, a reciprocating piston within said valve, having longitudinal grooves opening on the periphery of the piston, bearings movable in said grooves and projecting from the piston, the valve being provided with a split normally contracted and taping extension, the parts of which are engaged with said bearings to open the valve, by a movement of the piston in one direction, the bearings being disengaged from said extension parts when the piston moves in the opposite direction, and valve-closing springs engaged with the parts of the valve extension, said springs being inclined to exert extension-closing pressure on said parts.

11. An explosion engine comprising a fixed cylinder, a piston, a movable cylinder having resilient extensions adapted to engage the piston to receive the thrust therefrom, and springs engaged with said extensions for absorbing the said thrust.

12. An explosion engine comprising a fixed cylinder, a piston, and means for receiving and absorbing the momentum of the piston thrust, including a resilient movable cylinder constituting the receiving element of said means, and springs constituting the absorbing element, the said elements being joined together and acting simultaneously.

In testimony whereof I have affixed my signature.

WILLIAM F. COY.